United States Patent [19]
Hill et al.

[11] Patent Number: 4,729,534
[45] Date of Patent: Mar. 8, 1988

[54] STRAIN RELIEF BUSHINGS

[75] Inventors: Royce W. Hill, Flippin; Danny M. Nelson, Mountain Home, both of Ark.

[73] Assignee: Micro Plastics, Inc., Flippin, Ark.

[21] Appl. No.: 922,314

[22] Filed: Oct. 23, 1986

[51] Int. Cl.[4] ............................................. F16L 5/00
[52] U.S. Cl. ................................... 248/56; 174/153 G
[58] Field of Search ........................ 248/56, 74.3, 74.2, 248/51, 52; 174/153 G, 65 G, 152 G, 153 G; 16/2; 339/103 R, 103 B

[56] References Cited

U.S. PATENT DOCUMENTS

| | | | |
|---|---|---|---|
| 3,090,115 | 5/1963 | Carr | 174/153 G |
| 3,424,856 | 1/1969 | Coldren | 248/56 X |
| 4,033,535 | 7/1977 | Moran | 248/56 |
| 4,216,930 | 8/1980 | Rossler | 248/56 |
| 4,265,420 | 5/1981 | McCormick | 248/56 |
| 4,289,923 | 9/1981 | Ebert | 174/65 G |
| 4,517,408 | 5/1985 | Pegram | 248/56 X |
| 4,568,047 | 2/1986 | Matsui | 248/56 |
| 4,578,528 | 3/1986 | Borsh | 174/153 G X |
| 4,640,479 | 2/1987 | Shely | 174/153 G X |
| 4,646,995 | 3/1987 | Matsui | 248/56 |

*Primary Examiner*—J. Franklin Foss
*Attorney, Agent, or Firm*—Stephen D. Carver

[57] ABSTRACT

Unitary strain relief bushings for axially securing either a flat or round conduit comprised of two distinct but substantially externally similar bushing segments which are operationally hingeably folded together. Each generally "bullet shaped" bushing includes a tapered shank which extends between a narrowed front and an annular, larger diameter rear collar which is adapted to contact the workpiece. For manipulation purposes a major circumferential groove is defined in the collar, and it is adapted to be engaged by the curved tong elements of a conventional installing tool. A smaller diameter "snap fit" groove circumferentially defined upon the bushing between the shank and the annular collar shoulder is adapted to be snap fitted into the workpiece orifice. In the best mode the bushing comprises twin cooperating halves including a female segment and cooperating, similarly profiled male segment which may be operatively folded together against yieldable bias from integral low profile hinge structure which extends symmetrically between both halves. The female includes an internal cavity and the male includes a tongue portion which is adapted to be received within the cavity to contact and frictionally secure the cable. At least a portion of the thickness of the tongue is substantially aligned a portion of the width of the collar groove to minimize dynamic rocking effects otherwise introduced in response to collar compression. Moreover, the tapered nose of each bushing is preferably in the form of a paraboloid or ellipsoid.

5 Claims, 27 Drawing Figures

STRAIN RELIEF BUSHINGS

BACKGROUND OF THE INVENTION

The present invention relates generally to molded, plastic strain relief bushings. More particularly the present invention is related to two piece strain relief bushings which are folded together about a cord to be secured prior to installation in a suitable apertured work piece. It is believed that the invention is most properly classified in United States Class 174, Subclass 153.

In the prior art all known strain relief bushings of the two piece type comprise a relatively larger body portion which cooperates with a smaller friction block adapted to be snap fitted to the body. In many forms of prior art the friction block is integrally attached to the body by some form of hinge like strap structure so that both of the cooperating pieces are unitary. In other words, only once unitary piece exits from the mold during the manufacturing process, and only one part need be inventoried by the manufacturer or assembler. The two pieces are then folded together against yieldable tension from the connecting strap so as to appropriately align and insert the gripping block into the body portion about the electrical cord, for subsequent insertion into the previously established orifice in the work piece. Suitable frictional binding between integral internal parts and the outer insulation of the secured electrical cord is thus established, and the prior art in some instances provides for the creation of additional friction when axial pressure is placed upon the cord through the use of binding frictional serrations, grooves, recesses or the like.

U.S. Pat. Nos. 3,298,840 and more particularly 3,290,430 are typical of the latter structure. In these strain relief bushings the strap structure is generally flat, and it angularly extends between two pieces having their axis opposed by at least 90 degrees. As mentioned in Klumpp Pat. No. 3,290,430, in column 2, lines 7 through 20, for example, a fundamental object of such representative prior art is to avoid the use of hinge structure which had hitherto been a problem in "unitary" two piece strain relief bushings of that general type.

A wide variety of bushings adapted to prevent damage caused to an insulated electrical cable by unusual amounts of stress or strain are currently available and in use. However, as will be appreciated by those skilled in the assembly of electrical and electronic equipment, a number of yet unsolved problems are encountered with the installation and use of known strain relief bushings.

One major drawback of well-known strain relief bushings is that installation is cumbersome. Generally, the bushing must first be crimped into engagement with the insulating jacket of an electrical cord which has been inserted through a suitable mounting orifice. Then the bushing must be forced through the orifice until it comes into position in gripping engagement with the inner periphery of the orifice. Once the bushing is correctly positioned, its parts must be locked together to prevent displacement of the cord and the bushing from the mounting orifice. Finally, when a conventional compressive hand tool is employed to compress conventional strain relief bushing segments together, a rocking motion tends to become dynamically established at the point of internal tongue contact with the captured wire. Because of leverage, this motion tends to enlarge the width of the bushing front snout, and if deformation is extreme enough substantial resistance to orifice penetration may result.

It would therefore be desirable to provide a strain relief bushing which can be quickly and easily installed in gripping engagement with the insulating jacket of an electrical cord with a single hand motion. Moreover, it would be advantageous to provide a strain relief bushing of this type which is adapted to be loaded in the magazine of a hand-held pliers-like bushing assembly tool and installed in a single "shot" motion.

Another yet unsolved problem encountered with prior art strain relief bushings is the ineffective design of the strap or cord which connects interlocking sections of the bushing. The cords of bushings known to us are cumbersome and complicate installation of the bushing as well as subsequent access to the other electrical or electronic components of a particular system. Hence it would be most advantageous to provide an improved, streamlined, and flexible strap to connect interlocking portions of the strain relief bushing.

Also, well-known prior art strain relief bushings generally fail under unusual strain. Under tension of continued duration, the bushings known to us weaken, become distorted, and eventually pull away from the insulative jacket of the electrical cord and out of locking engagement with the mounting orifice. Thus it would be desirable to provide a strain relief bushing which is adapted to more securely engage the insulative jacket of the electrical cord when increased tension is applied to the cord.

One further problem yet unaddressed by prior art strain relief bushings is encountered where additional meshing is required to protect the electrical cord. The prior art bushings are not sufficiently flexible to fully encompass and effectively engage the wire with additional mesh insulation. Therefore it would be most desirable to provide a strain relief bushing which is adapted to fully encompass a wire with additional meshing protectors.

Numerous prior art patents exist for strain relief bushings employing two or more cooperative, interlocking parts. For example, U.S. Pat. No. 2,424,758 issued to Klumpp on July 29, 1947 teaches a two-piece, self-locking bushing which includes a body and a cooperating block portion which is adapted to be slidably fitted into the body after installation to prevent the cable from turning within its fitting. A plurality of fingers are provided to engage the collar of the two-piece snap bushing described by Klumpp in U.S. Pat. No. 4,137,602, issued Feb. 6, 1979. Other typical multi-part bushing construction is represented by U.S. Pat. No. 2,724,736, issued to Klumpp on Nov. 22, 1955 and Nicholson, U.S. Pat. No. 3,843,833, dated Oct. 22, 1974, which includes interior teeth or serrations adapted to grip the jacket of the electrical cord.

A variety of patents also exist for unitary strain relief bushings. For example, the bushings described by Klumpp in U.S. Pat. Nos. 2,424,756 and 2,424,757, issued on July 29, 1947, include a multiplicity of expanding fingers adapted to engage the wall plate after installation.

Among the various prior art patents which teach the use of a strap or tie to connect the cooperating parts of the bushing are: U.S. Pat. No. 2,930,840, issued to Klumpp on Mar. 29, 1960; U.S. Pat. No. 2,974,186, issued Mar. 7, 1961 to Klumpp; Klumpp, U.S. Pat. No. 3,290,430, issued Dec. 6, 1966; U.S. Pat. No. 3,689,014, issued to Fink on Sep. 5, 1972; Jemison, U.S. Pat. No. 3,749,818, issued July 31, 1973; and, U.S. Pat. No. 3,779,494, issued Dec. 18, 1973 to Nicholson.

SUMMARY OF THE INVENTION

The present invention comprises unitary strain relief bushings comprised of two distinct but substantially externally similar bushing segments which are adapted to be compressively folded together to securely sandwich and capture an electrical conductor or similar elongated conduit. A first embodiment of the present invention is directed to flat conductors; a second embodiment is aimed at round wires or cables.

After the two component halves are folded together, either bushing may then be axially inserted through a appropriate predefined orifice to axially and torsionally secure and restrain the cable or other conductor. Because of the preferred "bullet shaped" configuration of the tapered bushing nose, which in the best mode is actually in the form of an elliptic paraboloid, and because of other structural elements and characteristics to be hereinafter described in detail, rapid penetration of the workpiece orifice is insured. Moreover, rapid sequential assembly of numerous bushings by the assembly line worker is facilitated.

In each embodiment of the bushing segments are normally held together in an orientation which facilitates deployment (i.e, bushing installation) by a hinge structure whose geometry promotes and insures guided folding of the segments. Each bushing is adapted to be installed, for example, in a suitably dimensioned orifice such as a preformed D-hole within a usually metallic, planar workpiece to axially and torsionally restrain a power cord. While the instant bushings may be directly manually grasped by the fingers for installation with or without accessory tools, in the best mode a suitable hand tool may be advantageously employed. The preferred "bullet shaped" snout, geometrically in the form of an elliptic paraboloid, an ellipsoid, a hemishere or a paraboloid, facilitates aiming and insertion.

The generally "bullet shaped" two piece bushing includes a tapered shank which extends between a narrowed front nose and an annular rear collar which is adapted to contact the workpiece in which the bushing is installed. Preferably the integral, circular collar is of a diameter somewhat greater than the shank, and the annular, forward facing front shoulder of the collar is adapted to contact the wall or outer surface of the workpiece. For manipulation purposes a major circumferential groove is defined in the collar, and it is adapted to be engaged by the curved tong elements of the installing tool to simplify bushing installation.

In the best mode both bushings comprise twin cooperating halves including a female segment and an interfitting similarly externally profiled male segment which may be operatively folded together against yieldable bias from an integral hinge structure extending symmetrically between both halves. The female segment includes an internal cavity which receives at least a portion of the cable to be restrained. The male segment includes a tongue portion which is adapted to be received within the cavity to contact and frictionally secure the cable.

To insure dependable installation by preventing rocking of the parts in response to compression leverage, which may be experienced during installation, it is preferred that the internal male tongue be so located that its plane close to the plane of the outer collar groove. Preferably, approximately one half of the lower width of the tongue is coplanar with the forward half of the width of the collar groove. Also, a pair of oppositely disposed, cooperating guide slots are defined within the female half cavity to align and receive the tongue of the male, and to further resist rocking forces. In this manner the forward "snout" of the bushing is not forced apart in response to crimping tool pressure, so that the front of the bushing readily penetrates the orifice and hence installation is eased.

The primary segments are preferably joined together by an integral planar hinge which, immediately after preliminary bushing folding during installation, operationally assumes a cross sectional configuration in the form of a slice of the outer surface of a hypothetical cylinder. Due to this dynamic structural shape, folding of the constitutent bushing elements about the axis of the hypothetical cylinder (the surface of which the hinge comprises a slice) is facilitated, and alignment of the bushing segments is insured.

A smaller diameter "snap fit" groove is circumferentially defined upon the bushing midsection between the shank and the annular collar shoulder. It is spaced apart from and generally parallel to the major groove, and it is adapted to be snap fitted into the workpiece orifice. When the bushing is installed, the shank penetrates the orifice and the collar abuts the external surface of the workpiece. The disclosed geometry aids in positioning and aiming of then bushing.

Since the shaft may be so easily aimed and since it so readily enters the target orifice, the burden upon the assembler who must repetitively install, aim and position bushings upon a plurality of items is reduced, and assembler fatigue may be significantly reduced.

Thus a fundamental object of the present invention is to provide strain relief bushings which can be quickly installed in gripping engagement with the insulating jacket of round or flat conductors, wires, power cords and the like.

A similar object of the present invention is to provide a unitary strain relief bushing which is adapted to be loaded in the magazine of a hand-held bushing gun (or within the gripping tongs of a manual installation tool) and installed in a single axially moving "shot" motion.

A further broad object of the present invention is to provide a strain relief bushing which is adapted to non destructively grip the insulative jacket of an electrical cord when increased tension is applied to the cord.

Yet another broad object of the present invention is to provide a self-locking, twin segment bushing which includes a streamlined, low profile flexible strap to unite its interlocking body portions.

Another object of the present invention is to provide a two piece strain relief bushing with means whereby the parts tend to naturally seek operative alignment when the installer folds them together.

A still further object of the present invention is to provide two piece strain relief bushings of the character described which can be conveniently installed in a suitable work piece with a simple, repetitive straight motion.

A more fundamental object of the present invention is to provide a two piece strain relief bushing which comprises a pair of cooperative, geometrically opposed halves hingeably connected together by structure which urges the pieces together into operational position when the installer first incrementally "folds" the bushing prior to installation.

Still another object of the present invention is to provide a two piece, self-locking strain relief bushing which includes a plurality of friction reducing serrations for improved gripping engagement of the electrical cord secured by the bushing.

Another fundamental object of the present invention is to provide a strain relief bushing of an extremely ergonometric quality readily adapted for quick and easy manual installation in the assembly line process.

A related object is to provide a strain relief bushing of the character described which may be readily installed or manipulated by either hand of the installer, thus facilitating installation by ambidextrous assembly line works or the like.

A still further object of the present invention is to provide a two piece strain relief bushing of the character described which quickly snap fits into a suitable orifice of a work piece with a minimum of manipulation or effort.

A similar object is to provide a reliable, non-destructive two piece strain relief bushing of the character described which, once installed, is substantially impervious to axial or torsional displacement.

Yet another object of the present invention is to provide a two piece, self locking, strain relief bushing of the character described, the structure of which cooperates in the aiming and positioning of the bushing during insertion through the work piece orifice.

Another object of the present invention is to provide a hinged two piece strain relief bushing of the character described which is adapted to readily internally conform to the shape of the wire being restrained.

It is also an object of the present invention to provide a reliable two piece strain relief bushing which avoids unnecessary and cumbersome protuberances such as the elongated coupling straps which hitherto have been characteristic of prior art strain relief devices.

Another important object is to provide a bushing of the general character described which may be installed in relatively great quantities by assembly line workers without unnecessarily generating or promoting human fatigue, tendonitis, muscle soreness or the like.

A still further fundamental object of the present invention is to provide versions of the above described strain bushing capable of use with either flat or round wires, cables, conductors, conduits or the like.

Another object is to provide a strain relief bushing in which the center of gravity is as close as possible to the center of compression, whereby to promote dynamic stability when a captured wire or cable is compressed by the installation tool. It is a feature of the present bushing design that the male segment tongue is disposed in a plane aligned quite closely with the plane established by the locking collar groove so as to minimize flexing and leveraging during bushing installation.

A still further object of the present invention is to provide a strain relief bushing of the character described which may be easily assembled and installed with a one hand motion.

Yet another object of the present invention is to provide a strain relief bushing which lessens or eliminates the presently cumbersome and awkward strap of previous designs and allows for straight in assembly of the bushing.

Another object of the present invention is to provide a strain relief bushing that will assemble with a tool in one substantially "straight-in" motion.

Yet another object of the present invention is to provide a strain relief bushing with a connecting hinge located between externally symmetric halves which are disposed at a forty five degree angle from one another, to readily facilitate closing of the bushing about the wire or cord to be secured.

An additional object of the present invention is to provide a strain relief bushing with hinge location providing an anchor point that absorbs a portion of the cantilevering force generated when the component halves are crimped together.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 19 is a top plan view of an alternative embodiment of a strain relief bushing which is ideally adapted for round cables, conduits and the like;

DETAILED DESCRIPTION

Figures 1, 2:
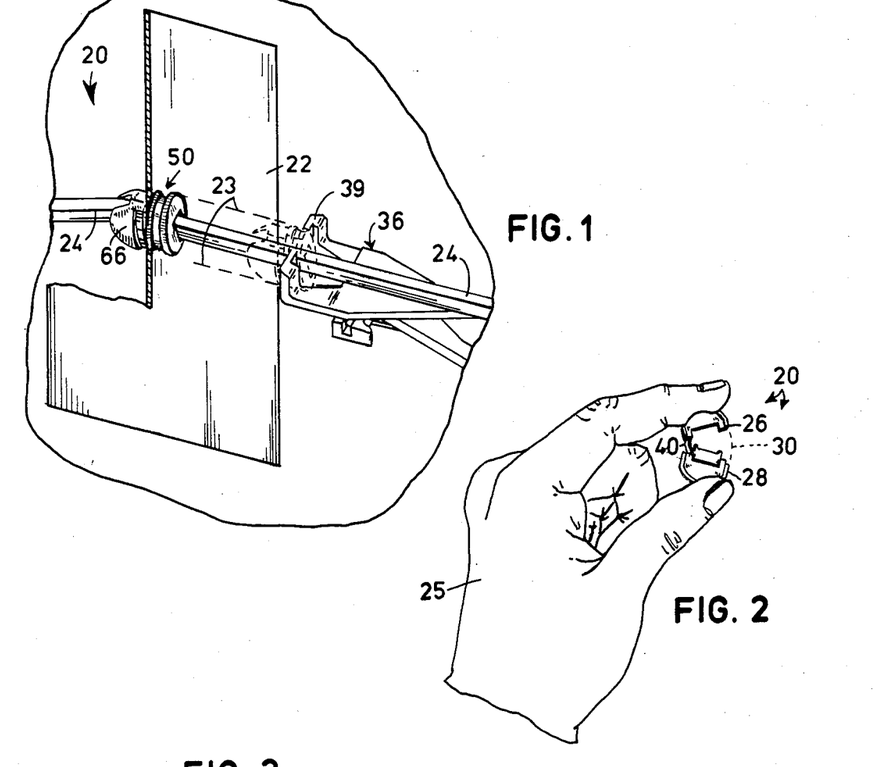
FIG. 1 is a fragmentary, pictorial view illustrating the installation of the preferred embodiment of our strain relief bushing.
FIG. 2 is a pictorial view of the invention, illustrating closure of the bushing between fingers of the installer, and the arc or radius scribed by the component parts in response to the preferred hinge structure.

With initial reference now directed to FIGS. 1 and 2 of the appended drawings, a strain relief bushing of the present invention has been generally indicated by the reference numeral 20. Bushing 20, and the others discussed hereinafter, are adapted to be installed in a suitably dimensioned orifice defined in a conventional workpiece 22 to axially and torsionally restrain an elongated cord such as the conventional twin conductor electrical power cord 24. Embodiment 20 is ideally adapted for use with "flat" conductors, but other embodiments discussed hereinafter may be used to restrain "round" conductors.

As best illustrated in FIG. 2, which illustrates the bushing in a slightly folded state or orientation bushing 20 is adapted to be grasped easily by the fingers of the hand 25 prior to installation with on without accessory tools. The twin halves of the bushing comprising female segment 26 and cooperating male segment 28 are adapted to be operatively folded together as indicated by dashed line 30 (FIG. 2). As will be appreciated from an inspection of the drawing figures, the physical exterior of the component bushing segments is preferably symmetrical.

While the bushing 20 may be installed without hand tools, it is preferable that a conventional bushing installation tool 36 is employed to conveniently engage and manipulate the bushing for installation purposes. Once grasped within the curved tongs 39 of conventional plier-like tool 36, bushing 20 need merely be gently compressed and inserted in the orifice. Because of the constructional attributes to be hereinafter described, the repetitive assembly line construction steps of grasping, aiming and snap fitting the bushing within the orifice to secure the cord to be restrained are greatly facilitated.

Figure 16:
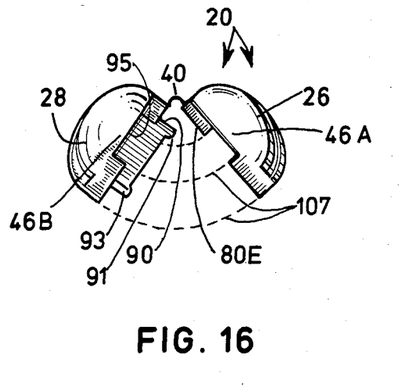
FIG. 16 is an enlarged scale, fragmentary, front plan view illustrating folding of the bushing segments into the deployed position, and illustrating certain folding arcs established by the hinge structure.
Figure 17:
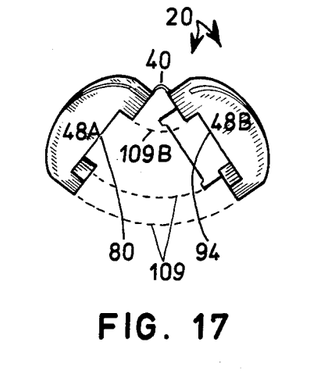
FIG. 17 is an enlarged scale fragmentary rear plan view illustrating additional arcs established by the preferred hinge structure.

Segments 26 and 28 are joined together by an integral, hinge-like strap 40 which, as best viewed in FIG. 2, is of short, flat rectangular dimensions immediately prior to folding, but which assumes a somewhat semicircular cross section immediately after at least slight folding has been initiated (i.e. during bushing deployment). The hinge facilitates folding into the operative position wherein the outer edges of the folded half or halves strike arcs indicated generally by line 30 in FIG. 2. Other structural portions strike arcs 107 (FIG. 16) and arcs 109 and 109B (FIG. 17) during bushing assembly. Hinge 40 thus establishes the radial center of the folding composite apparatus and the arcs struck by relative segment rotation insure that various internal parts are properly operatively aligned during assembly.

Figure 15:
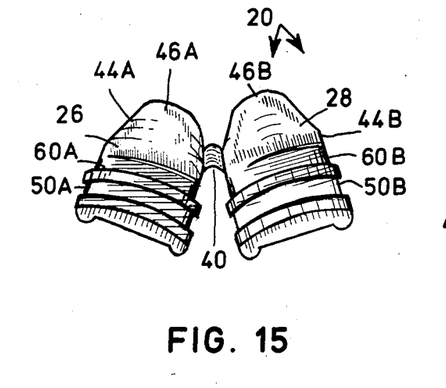
FIG. 15 is an enlarged scale, fragmentary side elevational view illustrating hinge operation.

When the two segments 26, and 28 are folded together during installation, the hinge 40 will guide and align the operative parts of the segments to insure proper assembly. A comparison of FIGS. 15 and 17, for example, will reveal that the hinge structure 40 dynamically assumes the form of a slice of a cylinder. Said slice is generated by the intersection of a plane and a cylinder, where the plane is parallel with and spaced apart from the cylinder axis. When the bushing is "unfolded" the hinge structure is planar.

Figure 6:
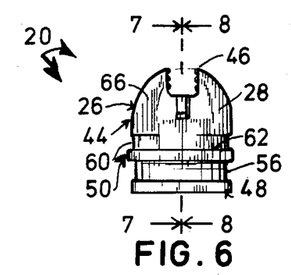
FIG. 6 is a top plan view thereof, with the bushing in a closed position.
Figure 8:
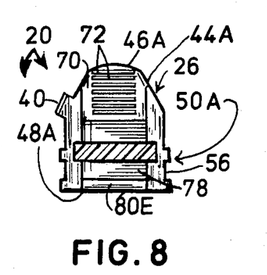
FIG. 8 is a sectional view, taken generally along line 8—8 of FIG. 6.
Figure 9:
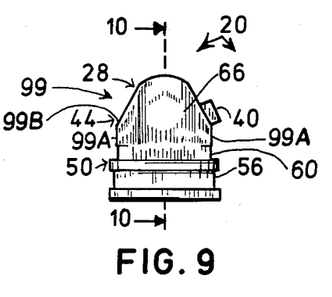
FIG. 9 is a front elevational view of a closed bushing.
Figure 10:
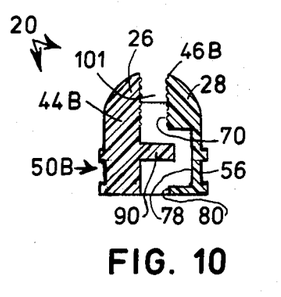
FIG. 10 is a sectional view taken generally along line 10—10 of FIG. 9.

With particular reference now directed to FIGS. 1, 6 and 9, in the assembled or deployed configuration the bushing 20 is preferably somewhat "bullet shaped," and in the best mode it is shaped generally in the form of a hemisphere, a parabolid, or an ellipsoid. It generally comprises a tapered shank 44 extending between a front 46 and a rear 48. The reference numeral 48A and 48B designate corresponding component rear surface portions of the lowermost rear surface of the integral collar 50 which, as viewed in FIGS. 6 through 10, is of a diameter somewhat greater than the shank 44.

The annular, flat forward facing front shoulder 62 of the collar 50 is adapted to contact the wall or outer surface 22E of the workpiece 22. For manipulation purposes a major circumferential groove 56 is defined in the collar 50, and it is adapted to be engaged by the curved tong elements 39 of the installing tool 36 to aid and facilitate bushing installation. For example, once the bushing is properly deployed about the cord 24, it may be manually axially moved as generally indicated by dashed lines 23 (FIG. 1) toward and into the orifice in surface 22E.

A reduced diameter minor "snap fit" groove 60 is circumferentially defined upon the bushing midsection between the shank 44 and the annular shoulder 62 of collar 50, and spaced apart generally parallel with respect to the major groove 56. Groove 60 is adapted to be snap fitted into the work piece orifice, with shank 44 penetrating through the orifice and with collar 50 abutting the surface 22 previously discussed. The tapered shaped shank is generally in the form of a paraboloidal, ellipsoidal, or hemispherical solid, the geometry of which aids positioning and aiming of the bushing. The disclosed shape (which results from the composite shape of the two segments 26,28) eases the burden upon the assembler who must repetitively install, aim and position bushings upon a sequence of electrical items being processed through the assembly line.

With primary reference now directed to FIGS. 7 through 14, the major individual body halves comprising segments 26 and 28 will be discussed in detail. For purposes of clarity reference numerals pertaining to the major overall outside structural elements of the assembled bushing have been employed wherever possible and assigned the suffix A in the "female" segment 26, and the suffix B in conjunction with description of the "male" bushing segment 28.

With additional reference now directed to FIG. 8, the female half or segment 26 of bushing 20 comprises a front shank point portion 46A which is spaced apart from corresponding collar portion 50A. It will be noted that a circumferential groove portion 56A is defined in its collar segment 50A, in spaced relation from the bottom surface segment 48A. Female segment 26 comprises a front tip portion 46A defined along the intersection of its bisected, preferably ellipsoidal or paraboloidal forward snout portion 44A and its inner flat surface 70.

A plurality of raised friction inducing ribs 72 are defined along this surface 70, and they are spaced apart from one another and disposed in generally parallel rows. Inner surface 70 is spaced apart across a cavity 78 of generally cubical dimensions which is pounded at the lower side of segment 26 by an interior wall 80, the surface 80E (FIG. 13) of which is generally parallel to surface 70. The opposite edges of cavity 78 comprise walls 83 and 84 (FIG. 11) which comprises suitable centrally located alignment slots 85 adapted to receive the elongated flat, generally rectangular tongue 90 of the male segment 28.

Figure 7:
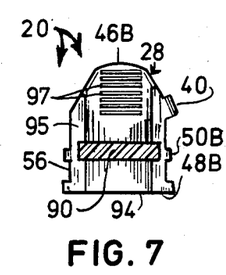
FIG. 7 is a sectional view taken generally along line 7—7 of FIG. 6.
Figure 11:
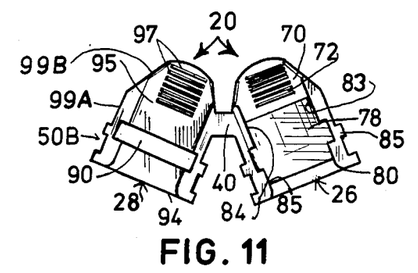
FIG. 11 is a side plan view illustrating the interior of the bushing in an open position.
Figure 12:
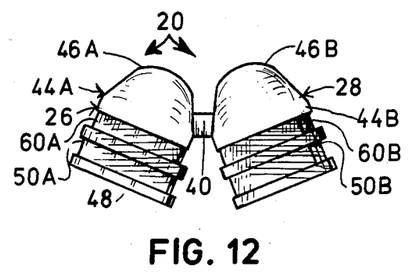
FIG. 12 is a side plan view of the exterior surface of the bushing in an open position.

With primary reference now directed to FIG. 7, the male portion 28 comprises an interior, generally planar surface comprised of rear segment 94 and a coplanar front segment 95 which are separated from one another by a generally cubical outwardly projecting tongue 90. Surface segment 95 comprises a plurality of elongated ribs 97 disposed in a rows which cooperate with ribs 72 previously discussed. Approximately midway between the length an elongated rectangular tongue 90 is integrally formed, and it is adapted to be projected radially around towards the tongue receptive grooved slots 85 defined in the female cavity 78 (FIG. 11). To this extent it will be noted that a pair of oppositely disposed, integral tongue tabs 91 and 93 (FIG. 16) are formed upon the outermost edges of the tongue, and when the component halves of the bushing are rotated into contact these tabs will initially contact the cavity guidance slot to insure proper penetration thereof.

Figures 3, 4, 5:
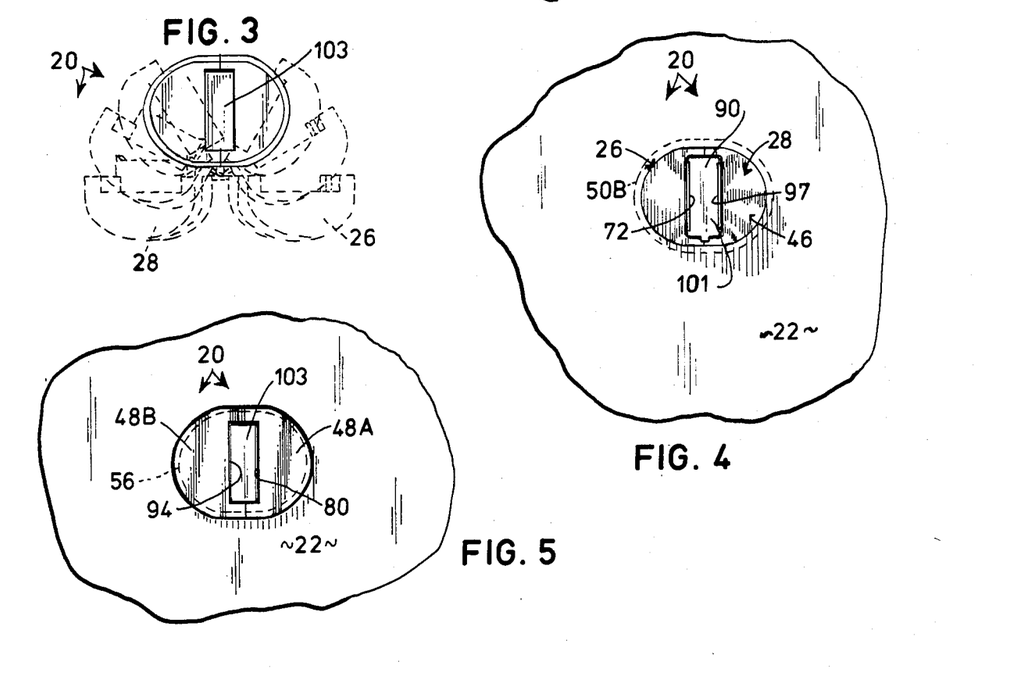
FIG. 3 is a enlarged scale, rear plan view thereof, wherein dashed lines have been used to illustrate the open position various and possible intermediate positions of the bushing segments between the open and closed configuration.
FIG. 4 is an enlarged scale, fragmentary, front plan view thereof, illustrating the installation of the bushing in a conventional work piece.
FIG. 5 is an enlarged scale, partial rear plan view thereof, installed as in FIG. 4.
Figure 18:
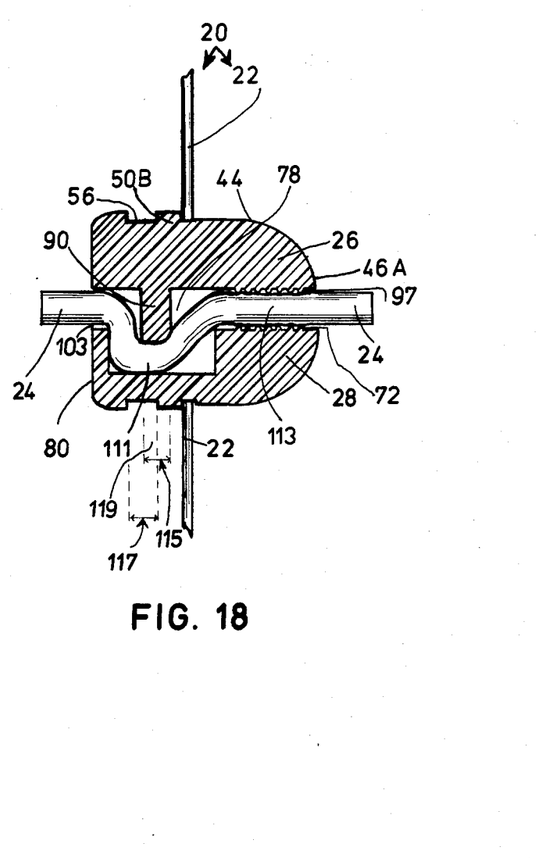
FIG. 18 is an enlarged scale, fragmentary sectional view of a deployed bushing, in which the best mode structural relationship between the width and location of the locking groove and the width and location of the tongue structure are shown in detail.

With reference now to FIGS. 4 and 18, it will be noted that when the members 26, 28 are folded together, the front portions thereof will be spaced apart from a generally rectangular orifice generally designated by the reference numeral 101. It will be noted that orifice 101 is bounded on opposite sides by the frictional ribs 97 and 72. The opposite rear orifice 103 is defined between the spaced apart and parallel surfaces 80 and 94 (FIG. 5). A not insubstantial portion 113 (FIG. 18) of the wire or cable 24 exiting orifice 101 will be restrained by sandwiching between these ribs 97 and 72. On the other hand, it will be appreciated that the wire 24 will extend through orifice 101, interiorly of the female cavity 78 and will exit the rear orifice 103 (FIG. 5) defined between the base portions or base surfaces 48A and 48B (FIG. 14) of the assembled rivet. Tongue 90 will force wire portion 111 firmly within cavity 78.

With reference directed now to FIG. 18, the tongue 90 preferably has a thickness illustrated generally by the arrow 115. The major annular groove 56 (i.e. in collar 50) has a width or thickness illustrated generally by arrow 117. In the best mode, an area of overlap, generally designated by the reference numeral 119, exists between the approximately one half of the front width of groove 56 and the approximately one half of the rear width or thickness of the tongue 90. Alignment of the structure in this fashion allows compressive forces developed about the groove 56 by manual gripping of the conventional installation tool 36 (FIG. 1) to concentrate upon wire portion 111, and the rocking motion of the front bushing snout which might otherwise occur is avoided.

Figure 13:
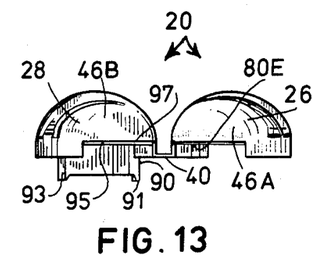
FIG. 13 is a front plan view illustrating the bushing in an open position.
Figure 14:
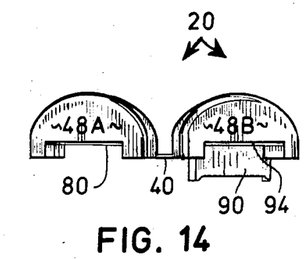
FIG. 14 is a rear plan view of the illustrative orientation of FIG. 13.

It will also be apparent that the apparatus shown generally in FIGS. 13 and 14 may be foldably manipulated between the extreme positions illustrated by FIGS. 13 and 14 to the assembled position of FIG. 3 as indicated by the dashed lines.

In the best mode the bushing includes lateral ridge structure, generally designated by the reference numeral 99, which aids in the deployment and positioning of the bushing within the target orifice. After insertion through the D-hole, for example, the combined action of the lateral ridge structure 99 and the snap fit groove 60, will facilitate captivation of the bushing within the hole, and torsional displacements of the bushing will be prevented. With reference to FIG. 9, the section line 10—10 coincides with the longitudinal axis of the bushing. Ridge structure 99 comprises flat portions 99A on either side of the bushing, which are parallel with and spaced apart form the bushing axis, and companion intersecting, acutely angled flat segments 99B, which run towards the bushing snout at the front of the structure.

With additional reference now directed to FIGS. 19–25, an alternative bushing has been generally designated by the reference numeral 120. Bushing 120 comprises a generally cylindrical interior, and it is primarily adapted to restrain wires or cords of a substantially circular cross section. However, all of its major structural elements are substantially similar with, if not identical to, the corresponding structure mentioned previously in conjunction with discussion of bushing embodiment 20. Hence, discussion of bushing 120 will be abbreviated.

Bushing 120 comprises a female segment 123 and a male segment 125 coupled together by an integral hinge 127. As illustrated best in FIGS. 19 and 23, the shank portion, generally designated by the reference numeral 128, is of tapered proportions, and it is preferably in the form of a regular paraboloid, ellipsoid or the like. It will be noted that the lower collar structure 130 comprises a major circumferential locking groove 132 which is spaced apart from a minor snap-lock groove 134 by flange portion 139. The rearward flange portion 141 comprises an annular abutting surface 142 which will contact the face of the workpiece to which the apparatus is installed.

Female segment 123 similarly comprises an internal cavity 145 which is somewhat recessed beneath the cylindrical surface 141A of flange 141 and the forward surface 150, which comprises raised frictional ribs 152. As before, a pair of slots 157, 158 are defined on opposite sides of cavity 145 to mate appropriately with the tongue portion of male segment 125.

Male segment 125 comprises a tongue generally designated by the reference numeral 153 which projects upwardly from lower floor 161. Floor 161 comprises a forward portion 163 equipped with a plurality of friction inducing ribs 164 which cooperate with ribs 152.

Figure 22:
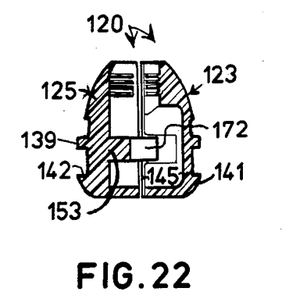
FIG. 22 is a sectional view of the bushing of FIGS. 19-21.
Figure 23:
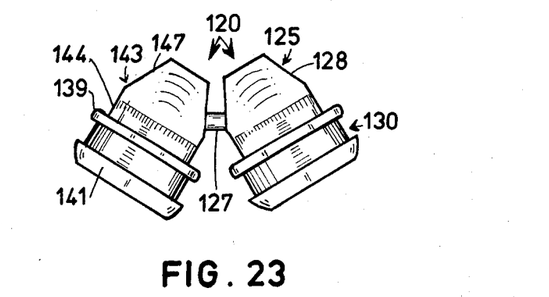
FIG. 23 is a side plan view of the exterior surface of the alternative bushing of FIGS. 19-22 showing it in an open position.
Figure 24:
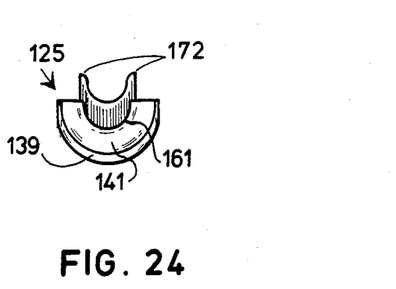
FIG. 24 is a fragmentary sectional view taken generally along line 24—24 of FIG. 21.
Figure 25:
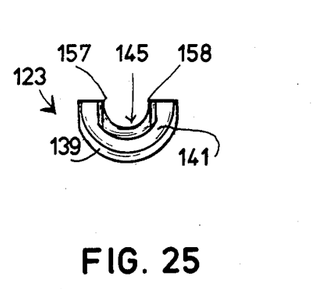
FIG. 25 is a fragmentary sectional view taken generally along line 25—25 of FIG. 20.

As illustrated in FIG. 23, when a bushing 120 is removed from a mold after assembly, it will be substantially planar, the male and female segments being rigidly held together by the short, somewhat flat, rectangular hinge structure 127. Immediately upon folding by manual manipulation of the installer, the various operative parts will be forced into alignment as aforedescribed. In particular, the opposite tongue edges 172 (FIG. 22) will first be forced within the grooves 157, 158 (FIG. 20)

within female cavity 145, to readily facilitate assembly of the bushing 120 about a cable to be captured within the bushing interior.

Figure 20:
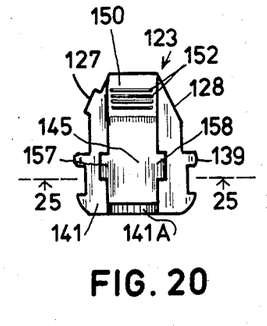
FIG. 20 is a sectional view taken generally along line 20—20 of FIG. 19.
Figure 21:
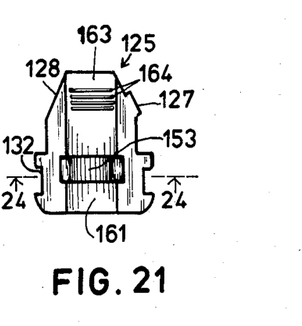
FIG. 21 is a sectional view taken generally along line 21—21 of FIG. 20.

Importantly, it will be noted best in FIGS. 20-22 that a portion of the width of the tongue 153 is substantially aligned with the width or depth of the major groove 132. By thus concentrating tongue-to-wire compressive forces in this narrow region interiorly of the bushing, the "rocking" motion which might otherwise occur which in the prior art, which tends to force apart the bushing segments, is avoided.

Figure 19:
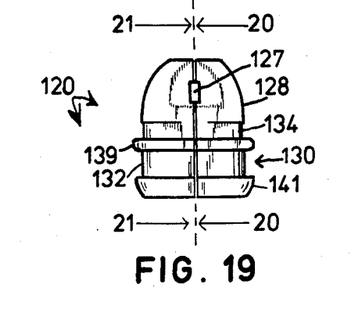

The longitudinal axis of bushing 120 is coincident with section line 21—21 of FIG. 19. The lateral ridge structure, indicated generally by the reference numeral 143, comprises portions 144 which are spaced apart from and parallel to the longitudinal bushing axis, and companion, acutely angled portions 147 which extend towards the bushing front snout.

Figure 26:
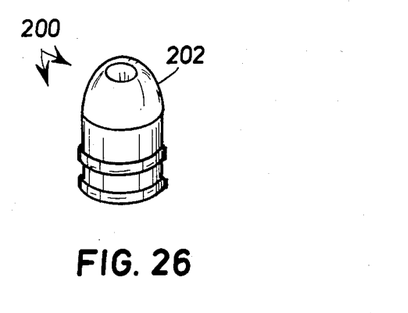
FIG. 26 is a perspective view of an alternative embodiment of a strain relief bushing characterized by an ellipsodial nose; and, FIG. 27 is a perspective view of an alternative embodiment of a strain relief bushing characterized by a paraboloidal nose.
Figure 27:
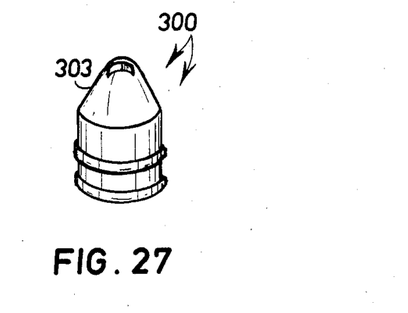

With reference now to FIG. 26, an alternative bushing 200 comprised of a pair of cooperating segments comprises a front, tapered nose 202 of an ellipsodial configuration. In FIG. 27, alternative bushing 300 comprises a forward nose 303 of a paraboloid geometry. In either event it is important to keep in mind that by virtue of tapered nose geometry similarly profiled upon two substantially equally sized segments, installation ease is facilitated.

Once any of the above-disclosed bushings are initially installed into an appropriately configured orifice and thereafter axially stressed, gradually increasing pressure upon the shank will assist in maintaining the stability and integrity of the compressed bushing segments prior to final engagement with the snap ring portion within the orifice. The installed bushings will be captivated within the workpiece, with the minor annular grooves anchored and positioned concentrically therewithin.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to the understood that all matter herein set forth or shown in the accompanying drawings is to be interpreted as illustrative and not in a limiting sense.

What is claimed is:

1. A strain relief bushing adapted to be installed within a predefined orifice in a workpiece to nondestructively secure an electrical power cord or the like, said strain relief bushing comprising:

first and second exteriorly symmetrical, tapered segments adapted to be cooperatively folded together to deploy said bushing, such that, after folding, the composite bushing comprises:
      a tapered shank portion extending between a front tip and a circular rear collar, the bushing taper being in the form of a paraboloid, ellipsoid, elliptic paraboloid, or hemisphere, said collar comprising an annular, front wall adapted to contract said workpiece;
      a major circumferential groove defined concentrically within said collar adapted to be grasped and manipulated by a bushing installation tool to compress said bushing during installation;
      a minor circumferential groove integrally defined in said shank adjacent said annular collar front wall for facilitating snap fitting of said bushing within said orifice;
   said first segment comprising an interior cavity adapted to firmly receive at least a portion of said cord;
   said second segment comprising an integral central tongue adapted to penetrate at least a portion of said cavity and urge at least a portion of said cord firmly within said cavity to restrain same when said segments are folded together;
   said tongue being of a first predetermined thickness, said major groove being of a predetermined width, and the rear half of the thickness of the tongue being substantially aligned with the front half of the width of said major groove;
   said cavity comprising a pair of aligned, cooperating spaced apart slots defined upon opposite internal sides therewithin for receiving said tongue when said bushing is deployed;
   an integral coupling hinge extending between said segments for normally yieldably biasing them apart, said hinge adapted to foldably guide said segments into proper alignment when they are radially foldably urged together to assemble and deploy said bushing, said hinge dynamically assuming the shape of a slice of the outer surface of a hypothetical cylinder when folding occurs whereby to urge said segments into proper operative alignment when they are radially coupled together.

2. The bushing as defined in claim 1 wherein said tongue comprises a pair of offset alignment tabs for facilitating penetrating engagement of said slots by said tongue.

3. The bushing as defined in claim 2 wherein said bushing shank comprises a pair of spaced apart lateral ridges defined integrally upon its opposite sides for resisting torsional displacements of said cord when said bushing is deployed, and said ridges comprise a first edge portion disposed substantially parallel to the longitudinal axis of the bushing and a second edge portion which intersects said first edge portion at an acute angle.

4. A strain relief bushing adapted to be installed within a predefined orifice in a workpiece to nondestructively secure an electrical power cord or the like against axial displacement relative to said orifice, said strain relief bushing comprising:

a first segment and an integral cooperating second segment each having substantially identical external dimensions and an outer appearance substantially the mirror image of one another, and each of said segments comprising:
      a bisected, tapered shank portion extending generally between a shank front and a rear collar;
      a major groove section defined concentrically within said collar adapted to be grasped and manipulated; and,
      a minor groove section integrally defined in said shank adjacent said collar;
   said first segment having an interior adapted to receive said cord and comprising a hollow cavity defined between said collar and the front of said shank;

said second segment having an integral central tongue adapted to urge at least a portion of said cord firmly within said cavity to restrain same;

said cavity comprising a pair of aligned, spaced apart guide slots defined upon its opposite internal sides for receiving said tongue when said bushing is deployed;

said tongue being of a first predetermined thickness, said major groove being of a predetermined width, and the rear half of the thickness of the tongue being substantially aligned with the front half of the width of said major groove;

the interior front of said shank portion of said first and second segments each comprises a surface equipped with a plurality of frictional ribs adapted to forcibly contact at least a portion of said cord when said bushing is assembled; and, an integral coupling hinge extending between said segments for normally fastening them together, said hinge adapted to guide said segments into proper alignment when they are folded together against yieldable bias from said hinge.

5. The bushing as defined in claim 4 wherein said first segment and said second segment each comprise lateral ridge portions defined integrally upon both opposite sides of their shank portions, the ridge portions of said first segment adapted to align with the corresponding ridges of said second portion when said bushing is installed, said ridges comprising a first edge portion parallel to the axis of its segment and a second edge portion intersecting said first edge portion at an acute angle.

* * * * *